United States Statutory Invention Registration [19]

[11] Reg. Number: H331

Gregory et al. [43] Published: Sep. 1, 1987

[54] LARGE MEMORY ACOUSTO-OPTICALLY ADDRESSED PATTERN RECOGNITION

[75] Inventors: Don A. Gregory; Joseph G. M. Duthie; Laura L. Huckabee, all of Huntsville, Ala.

[73] Assignee: The United States of America as represented by the Secretary of the Army, Washington, D.C.

[21] Appl. No.: 750,611

[22] Filed: Jul. 1, 1985

[51] Int. Cl.[4] ..... G06K 9/76

[52] U.S. Cl. ..... 382/31; 350/162.13; 350/358

[58] Field of Search ..... 382/31; 350/3.73, 3.78, 350/762.13, 96.13, 358; 364/819

[56] References Cited

U.S. PATENT DOCUMENTS

| | | | |
|---|---|---|---|
| 3,779,492 | 12/1973 | Grumet | 350/3.73 |
| 3,851,308 | 11/1974 | Kawasaki et al. | 382/31 |
| 4,330,178 | 5/1982 | McNaney | 350/358 |
| 4,549,789 | 10/1985 | Horiuchi et al. | 350/358 |

OTHER PUBLICATIONS

H. K. Lin et al., "Real-Time Screen-Aided Multiple-Image Optical Holographic Matched-Filter Correlator", Applied Optics, vol. 21, No. 18, Sep. 15, 82, pp. 3278-3286.

A. Vander Lugt et al., "The Use of Film Nonlinearites in Optical Spatial Filtering", Applied Optics, vol. 9, No. 1, Jan. 1970, pp. 215-222.

A. Vander Lugt, "Practical Considerations for the Use of Spatial Carrier-Frequency Filters", Applied Optics, vol. 5, No. 11, Nov. 1966, pp. 1760-1765.

Silverston et al., "Spectral Feature Classification and Spatial Pattern Rec.", *SPIE vol. 201 Optical Pattern Recognition* (1979), pp. 17-26.

Perry et al., "Auto-Indexing Storage Device", *IBM Tech. Disc. Bulletin,* vol. 12, No. 8, Jan. 1970, p. 1219.

Vitols, "Hologram Memory for Storing Digital Data," *IBM Tech. Disc. Bulletin,* vol. 8, No. 11, Apr. 1966, pp. 1581-1583.

*Primary Examiner*—Stephen C. Buczinski

*Assistant Examiner*—Linda J. Wallace

*Attorney, Agent, or Firm*—Freddie M. Bush; John C. Garvin, Jr.

[57] ABSTRACT

A method of and apparatus for acousto-optically addressed pattern recognition using Vander Lugt matched filtering. In optical correlation a beam of light containing an image to be examined is directed to fall on a matched filter array that contains a representation of an object of interest. Critical alignment between the beam and a matched filter of the array is achieved by acousto-optical deflection of the light beam. A large number of matched filters can be addressed sequentially at very high sampling rates, thereby providing a large memory capability for coherent optical image processing. In the system an object beam containing an image of interest is directed to a plane of interest where the matched filter is located. An acousto-optical device located in the object beam path is driven by a signal generator at megahertz frequencies. The acousto-optical device converts the megahertz frequency signals to acoustic waves that affect the density of the optical path of the object wave, changing the index of refraction at a selected plane in this path. This spatial modulation of the index of refraction across the path of the wave causes the incident light to be deflected at selectable angles. By proper selection of the megahertz frequency driving signals these variable angles are selected to direct the Fourier transform of the object beam to selected ones of an array of matched filters at the focal plane, allowing rapid correlation of any incoming intelligence information on the object beam with prerecorded information stored in a filter array.

2 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

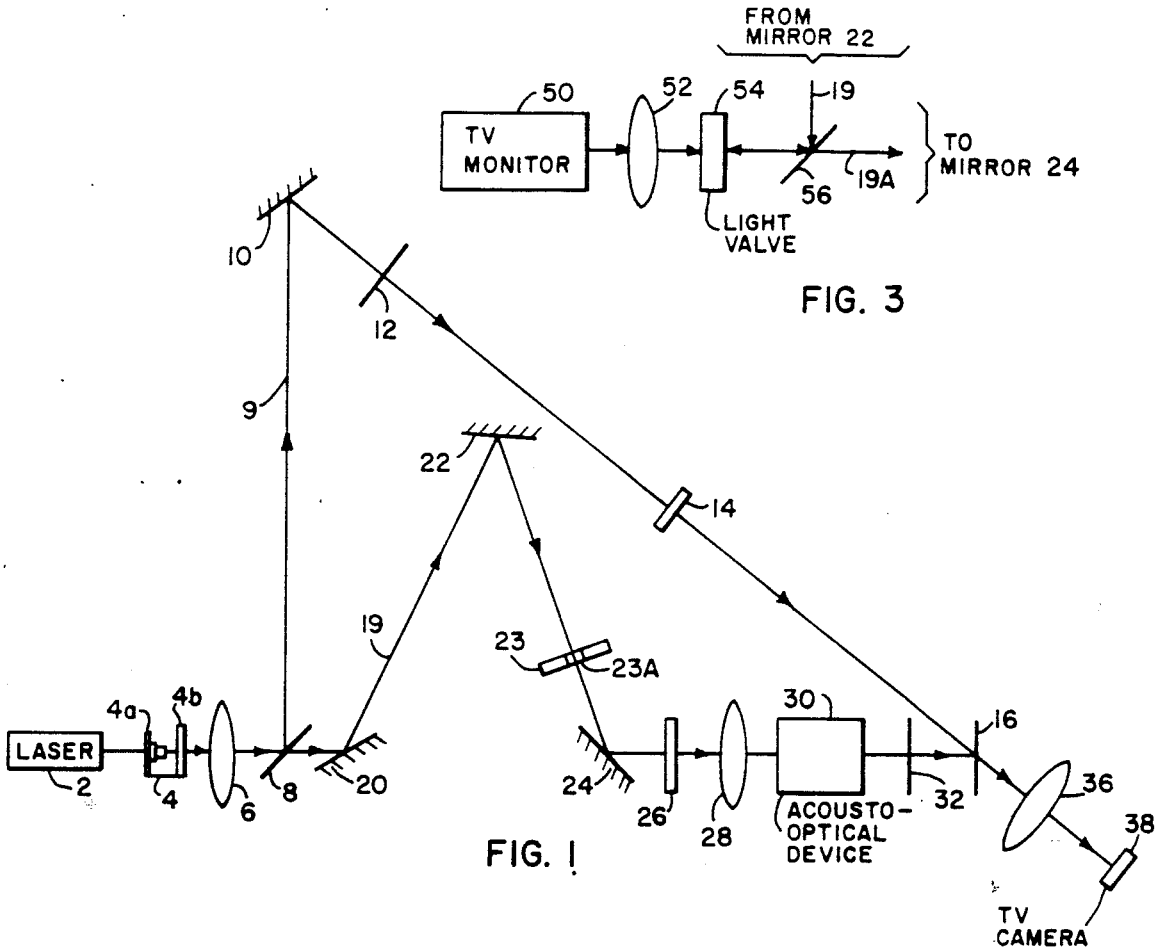
FIG. 3
FIG. 1
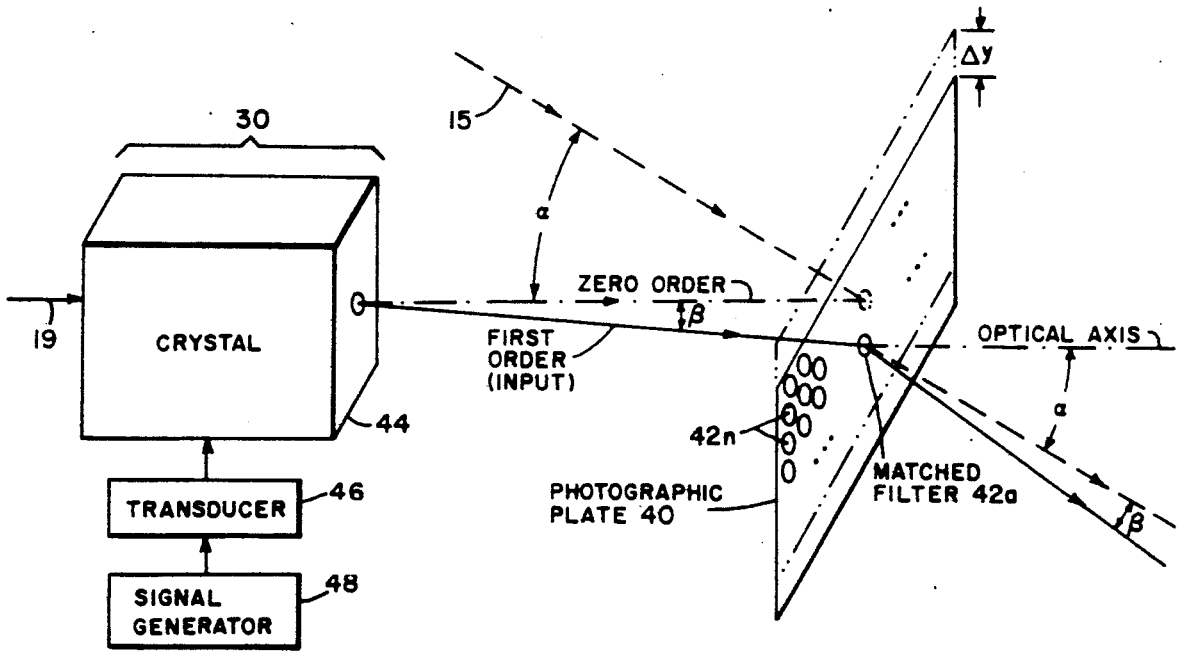
FIG. 2

LARGE MEMORY ACOUSTO-OPTICALLY ADDRESSED PATTERN RECOGNITION

DEDICATORY CLAUSE

The invention described herein may be manufactured, used, and licensed by or for the Government for governmental purposes without the payment to us of any royalties thereon.

BACKGROUND OF THE INVENTION

A major problem in the field of optical data processing is the limited number of matched filters that can be stored and addressed. A Vander Lugt matched filter is a holographic representation of the Fourier transform of an object stored on a photographic plate. A correlator uses this matched filter to identify and locate a desired object in some arbitrary input image. In its basic configuration, the Vander Lugt correlator requires that an input scene of interest be presented on a collimated, coherent beam of light. When the light passes into the correlator it passes through a lens and falls on a matched filter, which is accurately positioned in the back focal plane of the lens. Careful alignment of the matched filter and the focused beam is of critical importance. The lens is commonly referred to as the Fourier transform lens and its back focal plane as the Fourier transform plane. It can be shown that the light amplitude in the Fourier transform plane is mathematically the Fourier transform of the amplitude distribution of the input image impressed on the coherent light beam.

Two prior art solutions have been presented to the problem of storing many matched filters. In one of these methods, multiple holograms of the Fourier transforms of reference objects are stored at a single location on a photographic plate by multiple exposure. The capacity of the plate to store matched filters is limited however and, typically, the maximum number is about 8. In the second method the Fourier transform lens is replaced by a holographic optical element which generates an array of Fourier transforms at distinct points in the Fourier transform plane. The currently achieved limit this way has been 25 Fourier transforms. By combining both methods a total of 75 simultaneously addressed matched filters has been achieved. Although some improvement in this number can be anticipated, a ten fold increase is not likely. Typical of the problems encountered with the prior art methods, is the limited number of exposures on matched filters (8 and 25) that may be obtained. The holographic lenses allow arrays of matched filters to be made, but they also introduce a noise factor which greatly reduces the signal-to-noise ratio of the correlation signal. In addition, the holographic lenses tend to be very lossy and the small fraction of the incident light which is Fourier transformed is spread out over a large number of matched filters simultaneously. The overall efficiency of this method is quite low.

SUMMARY OF THE INVENTION

A method for acousto-optically addressed pattern recognition. In a Vander Lugt optical correlator, a coherent collimated beam of light containing a image to be examined passes through a lens and falls on a matched filter that contains a holographic representation of a Fourier transform of an object of interest. In the method of acousto-optically addressing the system, critical alignment between the beam and the matched filter is achieved by acousto-optical deflection of the light beam. This deflection is accomplished with high accuracy. A large number of matched filters can be addressed sequentially at very high rates, thereby providing a large memory capability for coherent optical image processing. In the system for accomplishing the method, the acousto-optic deflector is disposed in the laser beam path between the Fourier transform lens and the matched filter or filter array.

BRIEF DESCRIPTION OF THE DRAWINGS

FIG. 1 is a schematic diagram of the acousto-optically addressed pattern recognition system for both recording and addressing matched filters.

FIG. 2 is a schematic diagram of selected optical paths at the Fourier transform plane showing detection of a correlation signal from a matched filter.

FIG. 3 is a simplified schematic of an alternative embodiment for introducing an optical image of interest into the system.

DESCRIPTION OF THE PREFERRED EMBODIMENT

Referring now to the drawings wherein like numbers represent like parts, a preferred embodiment of the acoustooptically addressed pattern recognition system is shown in FIG. 1. A source of coherent light 2 such as a Helium-Neon laser has a beam emitted and directed through a filter arrangement 4. The beam is spatially filtered using a microscope objective **4*a* and pinhole arrangement 4*b*. As the beam leaves spatial filter 4, it is either a diverging or an expanding beam and is collimated by an appropriate lens 6. At this point the laser beam is split into two parts of equal intensity by a beam splitter 8**.

The optical recognition system has two separate paths from beam splitter 8. A reference beam 9 is initially directed substantially perpendicular to the original beam path. The other portion of the beam is the object beam 19. The reference beam path is used only while matched filters are being recorded or made and is blocked while they are being addressed. The reference beam is directed by a mirror 10 through a linear polarizer 12, which ensures that the reference beam is of the same polarization as the object beam. An iris 14 is located in the beam path after polarizer 12 to regulate the beam diameter or subsequent cross sectional area covered by the beam. Iris 14 may also be used to block this path when the reference beam is not being used. After passing through iris 14, the reference beam 9 then meets the focused object beam in the Fourier transform plane 16. In line with the reference beam beyond the intersection 16 of the reference and object beams are a focusing lens 36 and a TV camera 38.

As the object beam 19 leaves the beam splitter 8, it is reflected through a series of mirrors 20, 22 and 24 which equalize its path length with that of the reference beam. Before striking the last mirror 24, the beam passes through a film plate 23 with a transparent image 23A stored on it. This transparency, 23A, serves as the object to be recognized by the system. Object 23A may be any scene of interest coupled into the system by film or other means such as a liquid crystal light valve. During recording of a filter the object 23A may be a particular target of interest and scenes of the target may be taken from several angles. During pattern recognition or correlation, the object 23A may be an input scene of interest that contains a target of interest.

The image from 23A is carried by the beam to mirror 24 and is directed through an iris 26 to ensure that it is small enough in area to pass through an acousto-optic device 30. Before entering the acousto-optic cell 30, the beam passes through a Fourier transform lens 28.

Typically, as shown in FIG. 2, the active element within the acousto-optic device may be a tellurium dioxide crystal 44 attached to a piezo-electric transducer 46. This transducer is driven by a RF signal generator 48 capable of producing megahertz frequencies. The transducer 46 converts the RF signal to acoustic waves. As these acoustic waves pass through crystal 44, the density of the molecules of the crystal varies as the compressions and rarefactions of the wavefronts vary. This, in turn, changes the crystal's index of refraction. This spatial modulation of the index of refraction causes the incident light to be deflected at variable angles. There is also a zeroth order of undeflected light which passes directly through the acoustooptic cell. The acousto-optic cell 30 is turned off while the matched filters are being made so that only the zero order is present. The object beam passes through a polarizer 32 upon leaving the acousto-optic cell in order to ensure that its polarization is the same as that of the reference beam.

As shown in FIG. 2, this zero order focuses at the Fourier transform plane 16. At this focal plane the object beam interferes with the reference beam. A matched filter 42, can be made by placing a photographic film plate 40 at the plane 16 and exposing the plate or portions of the plate to the interferring beams. In this way an array of film portions 42*n* may be recorded for different images.

When the matched filters 42*n* have been made and are subsequently being addressed, the reference beam is removed (blocked), such as by closing or covering iris 14, and the acousto-optic cell is driven to produce deflected orders in the object beam. To seek correlation, the matched filters 42*n* are normally placed sequentially at the position expected for the first order deflection in plane 16. Fine tuning of the RF signal driving the acousto-optic device is used to get correct alignment of the beam 19 with a particular filter image 42*a*. Light diffracted from an aligned filter 42*a* passes through the lens 36 and onto a detector such as TV camera 38 placed in its back focal plane. The diffracted light in this back focal plane is the cross correlation between an input object image 23A and the stored reference image 42*a*.

Many matched filters 42*n* can be stored on a single photographic plate and addressed simply by changing the RF frequency applied to the acousto-optic cells. It is also possible to address matched filters at other than the first order of diffraction from the acousto-optic cell. The zeroth or second or higher orders may also be used if desired.

In the acousto-optically addressed pattern recognition method the acousto-optic deflector is incorporated in the laser beam path between the Fourier transform lens and the matched filter. Matched filters made either with or without the acousto-optical device can be selectively addressed by simply changing the frequency at which the deflector is driven. By using a pair of acousto-optical devices or a single device that produces two-dimensional deflection, large two dimensional arrays of matched filters can also be used, providing filter capability that far exceeds the limited matched filters of the prior art. The acousto-optical device also produces a clean correlation signal with very little noise.

The system shown in FIG. 1 is similar to the standard Vander Lugt method for making matched filters, except for the addition of the acousto-optic deflector 30 between Fourier transform lens 28 and the photographic plate 40 in plane 16. The acousto-optical deflector or cell 30 shown in FIG. 1 may be located in other places in the object beam path. Typically, another location for the cell is between the object 23 and the Fourier transform lens 28.

In operation of the system for pattern recognition, an existing matched filter plate may be inserted in the system as plate 40 and may be acted upon to find a match with 23A (recognition). As has been noted, the reference beam is blocked during this time. If it is desired to make a matched filter plate using the system, the reference beam path is opened and the plate is subjected to both beams (reference and object).

In making a matched filter plate, as is well established in the art, after exposing a photographic plate 40 (such as Kodak 649F) to the interference of the reference beam and the Fourier transform of the zero order object beam, the plate is developed using standard techniques (such as Kodak D-19 developer, Kodak stop bath, and Hunt's fixer).

Once a filter plate is made the image stored on the plate may be compared with an image from a real-time scene or a recorded scene to see if a match (recognization or correlation) can be made between the known established image on the filter and a portion of the image in the scene. To do this the plate 40 is placed back in the system, the reference beam path is blocked and the correlation signal, if it exists, is detected using a camera such as an RCA model TC-1160 TV camera. The detected correlation signal may be subsequently displayed on a TV monitor. As shown in FIG. 2, deflecting the beam away from the zero axis has the effect of translating the matched filter plate 40 vertically so that one of the deflected orders from the acousto-optical device addresses a matched filter 42*a* made with the zero order. If correlation exists, it is then detected in the same plane as before but it is displaced in the vertical direction, corresponding to the angle between the zero order and the order addressing the filter.

Thus, when the transformed beam of an optical image or images passes through the matched filter, a correlation light beam is created when correlation occurs. This correlation beam is the diffracted light that is indicative of correlation between the optical image of interest and the corresponding reference image stored in the matched filter. This diffracted signal is detectable in the back focal plane of the array.

The operational cycle of a very large memory optical recognition system is essentially a repetition of the above cycle. Matched filters 42*n* may be created in rows or columns, or both, then addressed using the acousto-optical device. Typically, two acousto-optical devices can be paired to address two dimensional arrays of Fourier transformed image filters. The filters can be made, as previously mentioned, with the zero order, or they can be made in an entirely separate, standard Vander Lugt arrangement. Established state of the art micropositioning devices (not shown) are used in the sequential exposing of a photographic plate to produce the arrays of matched filters.

In a typical real time system incoherent-to-coherent light modulators may be used in place of the transparent optical image 23A or film plate 23. For example, a liquid crystal light valve (LCLV) can be used. FIG. 3 is a schematic showing the typical circuitry that would replace film plate 23 when a LCLV is used. An input scene of interest is viewed by a television camera (not shown) and the scene is imaged or displayed on a television screen or monitor. This conventional monitor 50 is imaged by a transfer lens 52 onto the input side of a liquid crystal light valve 54. A photoactivated LCLV can receive image inputs in real time from non-coherently illuminated scenes and convert these images to a coherent optical output. The coherent image is read out by directing the collimated and suitably polarized light beam 19 through a beamsplitter 56 and thence to the output side of the light valve 54. The beam reflected from the LCLV is then polarization modulated according to the intensity of the input scene. The signal or image modulated beam is then coupled back through the beamsplitter 56 as output beam 19A. Beam 19 represents the beam coming from laser 2 via mirror 22 of FIG. 1. Elements 50-56 replace the film plate 23 and introduce the image onto the beam.

Obviously, as noted hereinabove, many modifications and variations of the present invention are possible in light of the above teachings and encompass the entire field of optical data processing where acousto-optical modulations are applicable. It is therefore to be understood that, within the scope of the appended claims, the invention may be practiced otherwise than as specifically described.

We claim:

1. A method of addressing the Fourier transform of stored optical images for optical pattern recognition comprising the steps of:

placing a transparent optical image in the path of a laser beam;

passing a laser beam along a predetermined path through the image for superimposing the image on the beam;

transforming the beam with the superimposed image by Fourier transformation;

spatially modulating the transformed optical images to deflect the images at selectable angles away from said predetermined path;

directing the transformed beam of optical images to a matched filter array for creating a resultant correlation light beam from the filter;

passing the created correlation light beam to the back focal plane of the array;

detecting the resultant correlation light beam at the back focal plane; and displaying a diffracted light in the focal plane that indicates correlation between the transparent optical image and a corresponding reference image stored in said matched filter array.

2. A method of addressing the Fourier transform of stored optical images for optical pattern recognition as set forth in claim 1 wherein the step of spatially modulating is carried out by passing the transformed beam with superimposed images through an optically transparent medium; and modulating the index of refraction of said medium by applying acoustic waves thereto.

* * * * *